US00RE35751E

United States Patent [19]

Midgley

[11] E Patent Number: Re. 35,751

[45] Reissued Date of Patent: Mar. 24, 1998

[54] MONITORING SYSTEM WITH DUAL MEMORY FOR ELECTROPHOTOGRAPHIC PRINTING MACHINES USING REPLACEABLE CARTRIDGES

[75] Inventor: Christian G. Midgley, Fairport, N.Y.

[73] Assignee: Xerox Corporation, Stamford, Conn.

[21] Appl. No.: 379,830

[22] Filed: Jan. 27, 1995

Related U.S. Patent Documents

Reissue of:

[64] Patent No.: 5,283,613
Issued: Feb. 1, 1994
Appl. No.: 19,486
Filed: Feb. 19, 1993

[51] Int. Cl.[6] ..... G03G 15/00

[52] U.S. Cl. ..... 399/25; 399/26; 399/27

[58] Field of Search ..... 355/203, 204, 355/206, 209, 200, 210, 211, 260; 364/525, 550; 377/2, 15, 16; 347/86; 399/9, 24, 25–27

[56] References Cited

U.S. PATENT DOCUMENTS

| | | | |
|---|---|---|---|
| 4,551,000 | 11/1985 | Kanemitsu et al. | 355/210 |
| 4,585,327 | 4/1986 | Suzuki | 355/211 |
| 4,586,147 | 4/1986 | Tadokoro | 364/550 |
| 4,629,164 | 12/1986 | Sommerville | 239/69 |
| 4,774,544 | 9/1988 | Tsuchiya et al. | 377/15 X |
| 4,961,088 | 10/1990 | Gilliland et al. | 355/206 |
| 5,021,828 | 6/1991 | Yamaguchi et al. | 355/209 |
| 5,101,233 | 3/1992 | Ito et al. | 355/209 |
| 5,196,884 | 3/1993 | Sugiyama et al. | 355/200 |
| 5,206,685 | 4/1993 | Hara et al. | 355/206 |
| 5,220,386 | 6/1993 | Aoki et al. | 355/210 X |
| 5,365,312 | 11/1994 | Hillmann et al. | 355/206 |

FOREIGN PATENT DOCUMENTS

0433280B1 4/1993 European Pat. Off. .

*Primary Examiner*—William J. Royer
*Attorney, Agent, or Firm*—R. Hutter

[57] ABSTRACT

A monitoring system for replaceable units, such as toner cartridges in an electrophotographic printer, includes on the unit an electronic count memory and an electronic flag memory. The count memory maintains a one-by-one count of prints made with the cartridge. The flag memory includes a series of bits which are alterable from a first state to a second state but not alterable from the second state to the first state. The bits in the flag memory are altered at predetermined intervals as prints are made with the cartridge. The flag memory is used as a check to override unauthorized manipulation of the count memory.

19 Claims, 9 Drawing Sheets

MONITORING SYSTEM WITH DUAL MEMORY FOR ELECTROPHOTOGRAPHIC PRINTING MACHINES USING REPLACEABLE CARTRIDGES

Matter enclosed in heavy brackets [ ] appears in the original patent but forms no part of this reissue specification; matter printed in italics indicates the additions made by reissue.

The present invention relates to electrophotographic reproducing machines, and more particularly to a monitoring system for the use of one or more replaceable cartridges in such a reproducing machine.

Recently, electrophotographic reproducing machines have been developed which use one or more replaceable subassembly units, familiarly termed cartridges. One typical cartridge comprises a toner supply and the necessary supporting hardware therefor assembled in a single unit designed for insertion and removal into and out of the machine. When the cartridge is used up, the old cartridge is removed and a new one substituted. Other replaceable cartridges including developer cartridges, photoreceptor cartridges, etc., may also be envisioned for this purpose.

However, where the cartridge also serves as the vehicle for billing the customer for the number of prints or copies made, it becomes important that the cartridge not only reliably provide all the copies for which the customer has paid, but also that there be a reliable and fail safe way to control and monitor the cartridge's use. The customer should get exactly the number of prints guaranteed for the cartridge. If less, the manufacturer should make up the difference free of charge.

Also, the customer should get no more than the print number warranted. But since any customer would obviously find it advantageous to obtain more prints than he is supposed to get and can probably be expected to try to use the cartridge beyond the warranty stage, it is also important to the manufacturer to make sure, once all of the prints have been made and the cartridge is exhausted, that the cartridge is disabled and that no further prints can be made by the cartridge. Further, it is highly desirable that the customer be given a warning when the cartridge is close to the end of its life so that there is time for the customer to obtain a fresh cartridge before the old cartridge is used up.

U.S. Pat. No. 4,551,000 discloses a replaceable "process kit" for an image-forming apparatus, such as a copier or printer, which includes apparatus for indicating when the useful life of the process kit is about to expire and when it has expired.

U.S. Pat. No. 4,961,088, which is incorporated into the present application by reference, discloses a system for monitoring replaceable cartridges in printers or copiers. Each replaceable cartridge includes an EEPROM (Electrically Eraseable Programable Read Only Memory). The EEPROM associated with each cartridge may be programmed with an identification number and means for retaining a count of prints or copies made with the unit. The EEPROM may also be designed to retain a cartridge replacement warning count and a termination count at which the cartridge is disabled from further use.

U.S. Pat. No. 5,021,828 discloses a replaceable unit for use in a copier or printer, in which initial use and near-end-of-life use is recorded by electrical means including a portion, itself removable from the replaceable unit, comprising two fuses. A first fuse is blown when a few copies have been made with the replaceable unit, and the second fuse is used to prevent further use of the replaceable unit when a certain number of copies or prints have been made therewith.

With any electronic record-keeping device for maintaining a cumulative count of prints made of a particular cartridge, there is a disadvantage in that the most practical kind of memory, in which a running tally of print count is continuously maintained, is a volatile electronic memory. That is, the simplest possible design would be one in which a single number is held in a volatile memory associated with the cartridge, and 1 is subtracted from this number with every print made with the cartridge. However, this subtraction is, in effect, the erasing of one number and its replacement with another number 1 less than the preceding number. The volatility of a memory which enables this running count also allows the memory to be easily tampered with: if a number less than the preceding number is repeatedly loaded into the memory, it would not be difficult for a sophisticated user of the machine to figure out how to load numbers out of sequence, thereby artificially extending the life of the cartridge. A purpose of the present invention is to enable a design which has the simplicity of a volatile memory, but which is substantially tamperproof.

According to the present invention, there is provided a monitoring system for a replaceable unit in an electrophotographic apparatus, the replaceable unit being adapted to produce, or otherwise relate to, a predetermined number of prints. A first memory, permanently associated with the replaceable unit, is adapted to retain counting data relating to the cumulative output of the replaceable unit, and a second memory, also permanently associated with the replaceable unit, includes a plurality of electronic "flags" associated therewith. Each flag is in the form of a portion of electronic memory and statable in a first state or a second state. Each flag in the second memory may be altered from the first state to the second state, but not from the second state to the first state. Means are provided in the system for altering one flag in the second memory from the first state to the second state when a predetermined cumulative output is reached by the replaceable unit. Means are provided for comparing counting data in the first memory with the number of flags in a given state in the second memory, so that the counts from the first memory and the second memory may be made consistent.

Figure 4A:
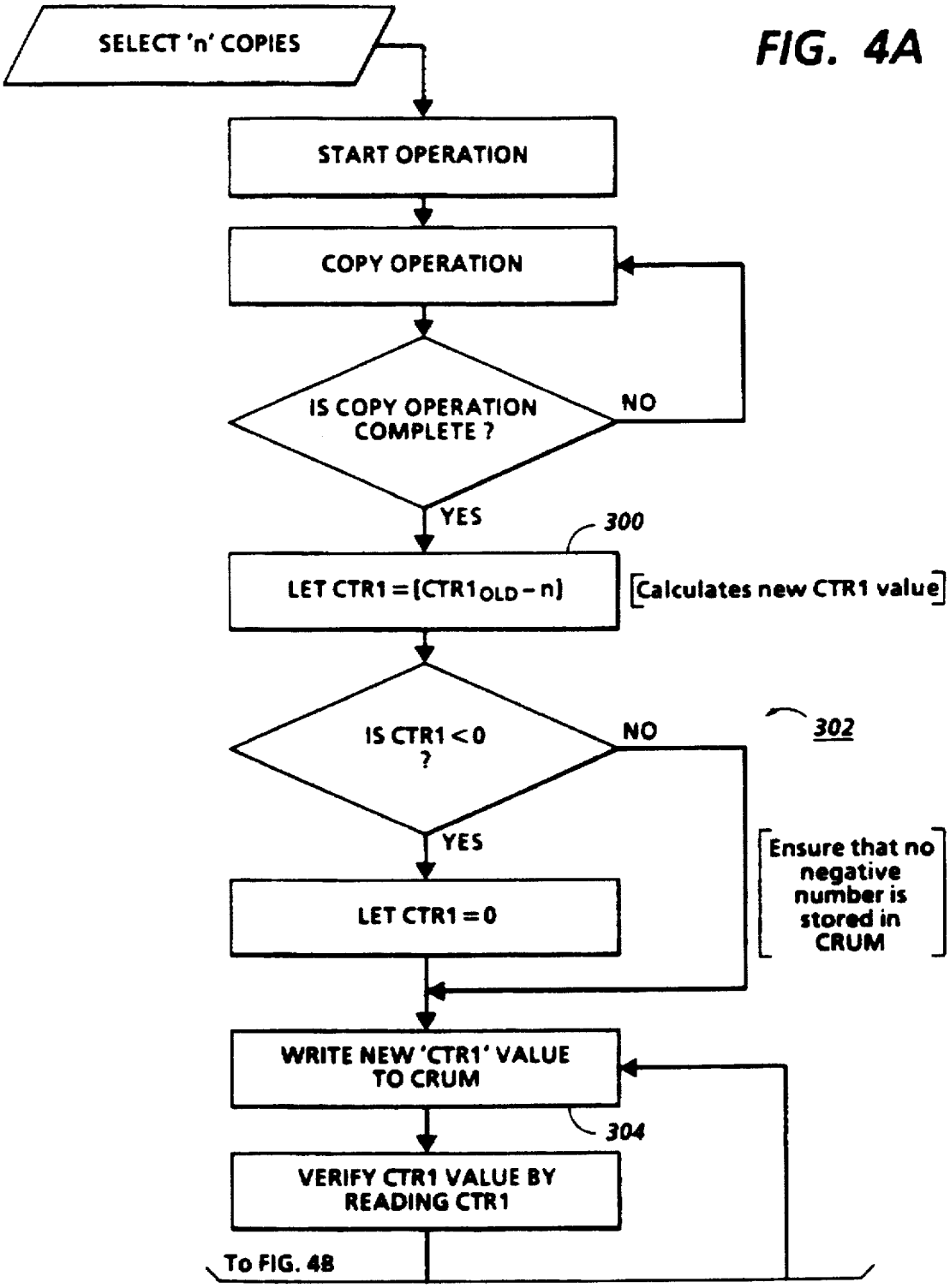
Figure 4B:
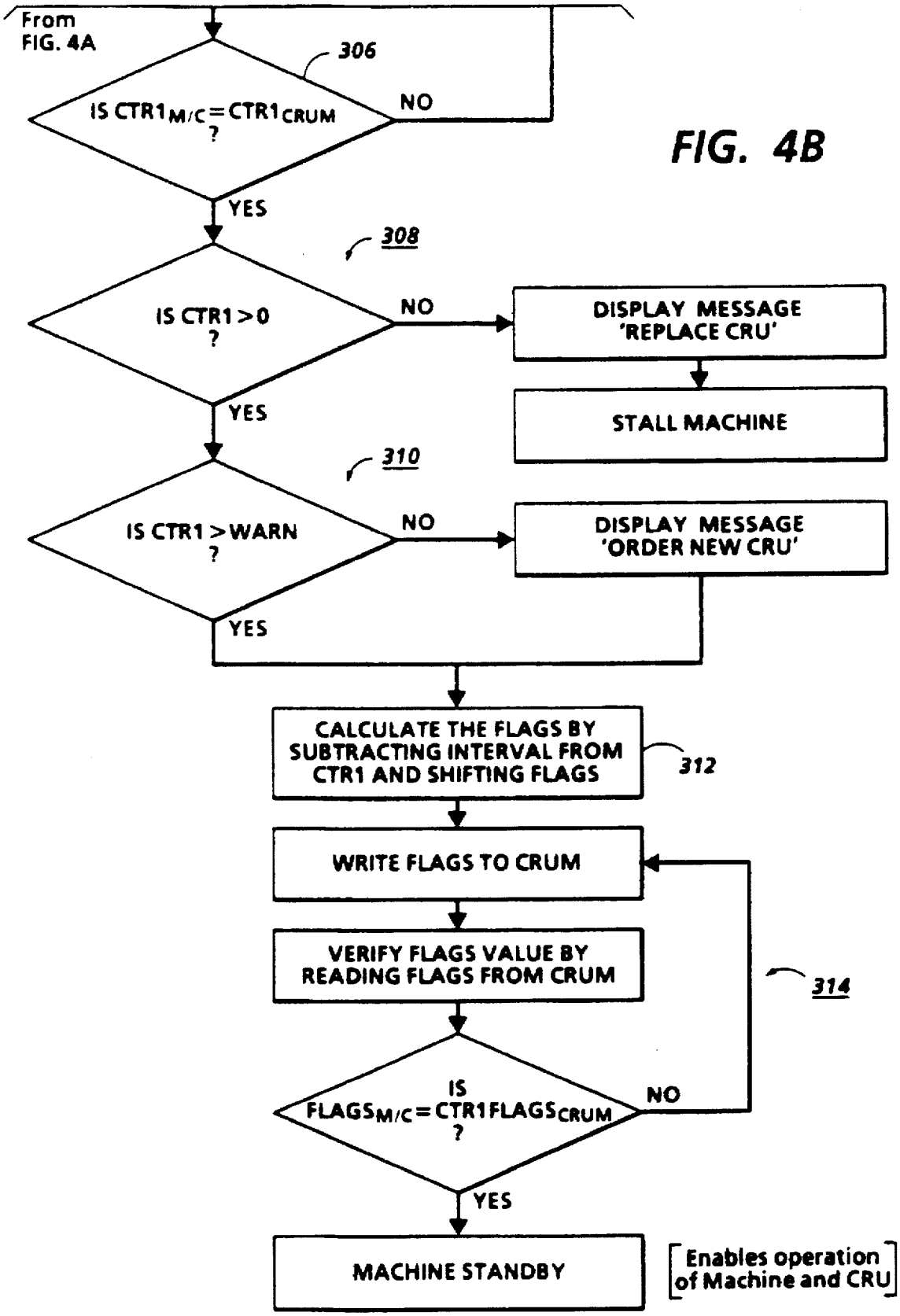
Figure 5:
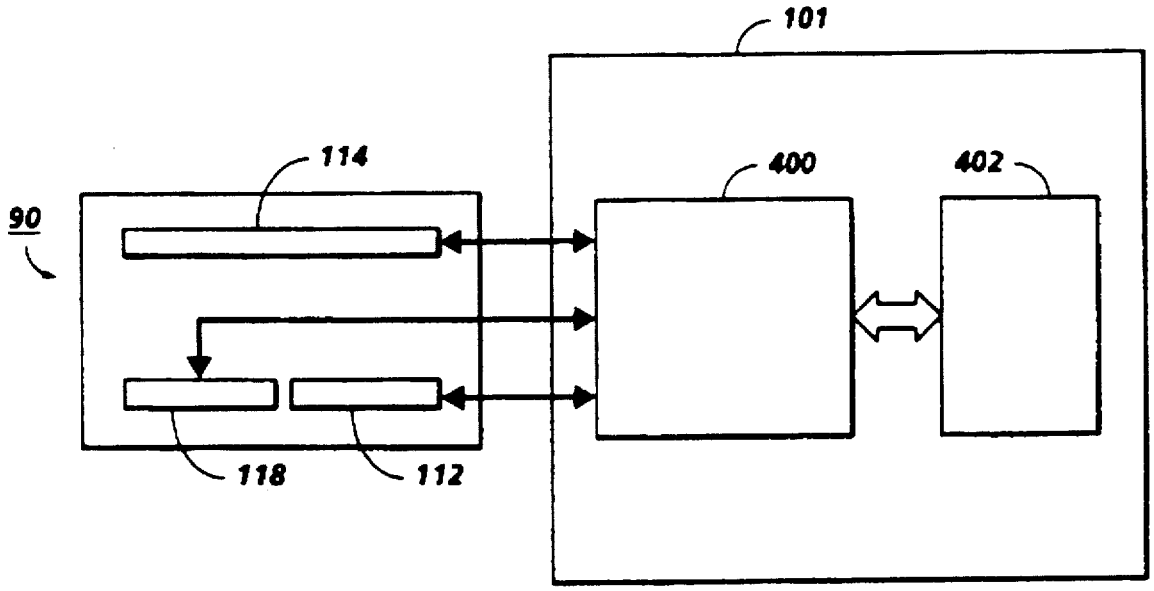
Figure 6:
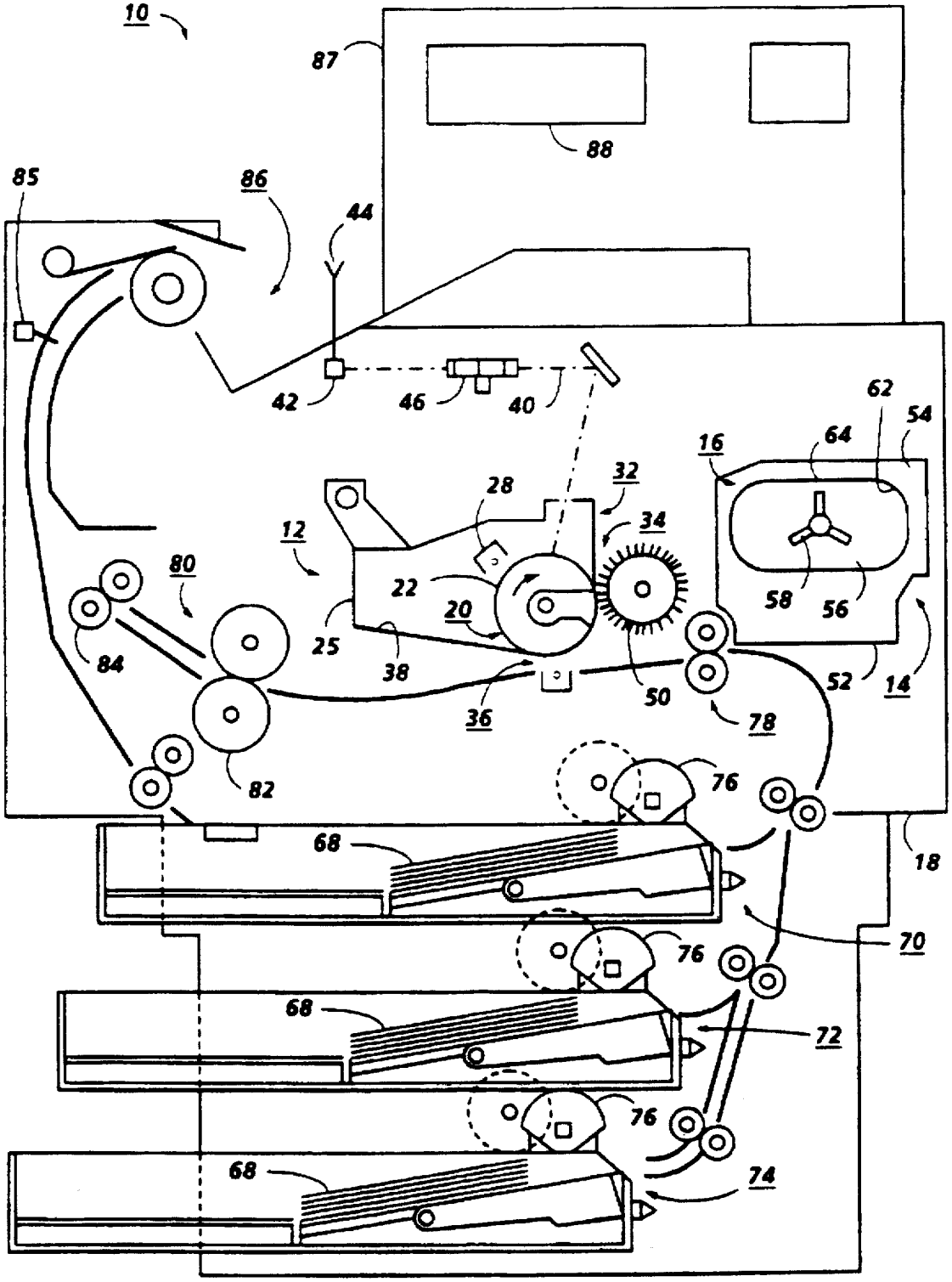
FIG. 6 PRIOR ART
Figure 7:
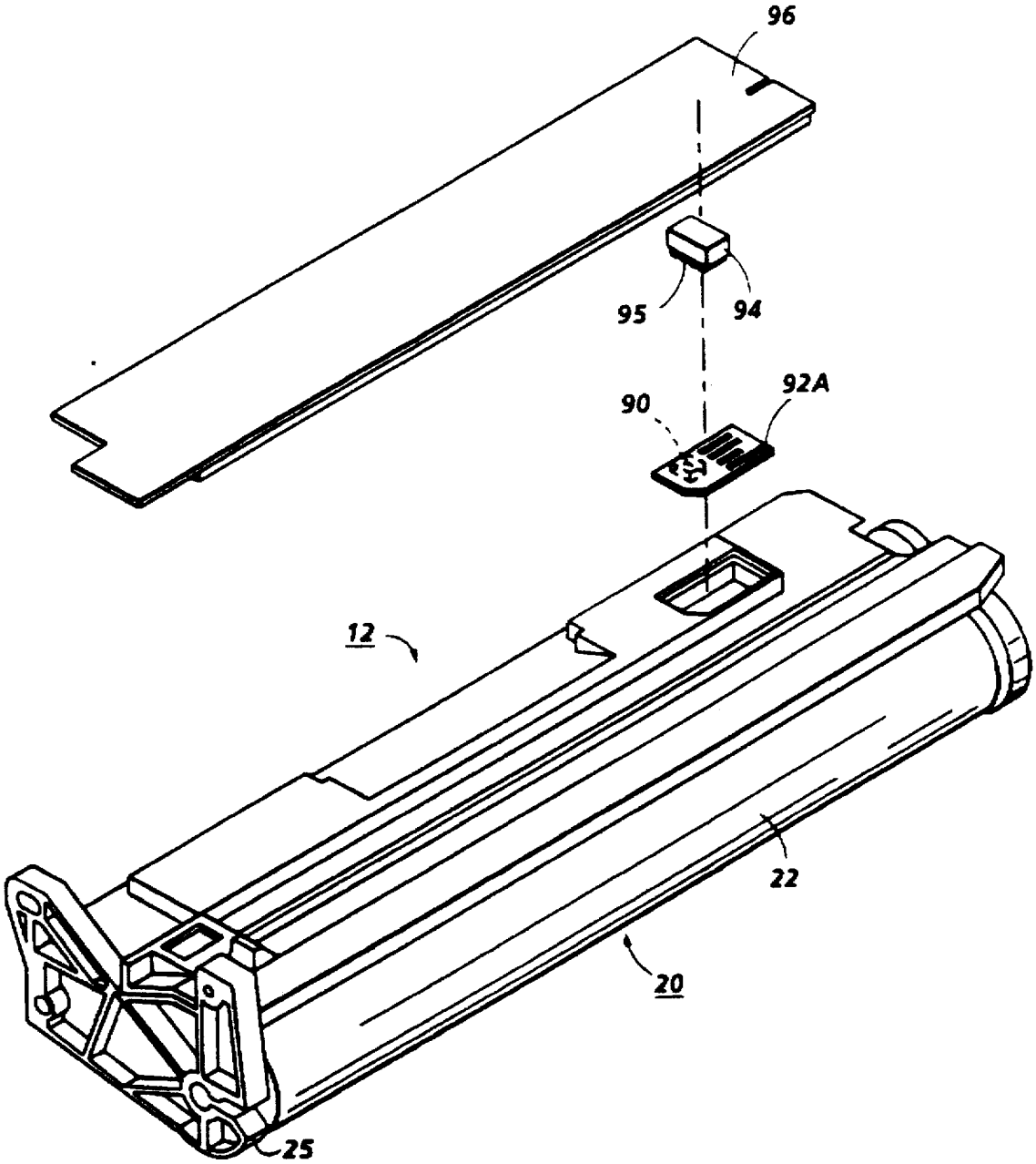
FIG. 7 PRIOR ART
Figure 8:
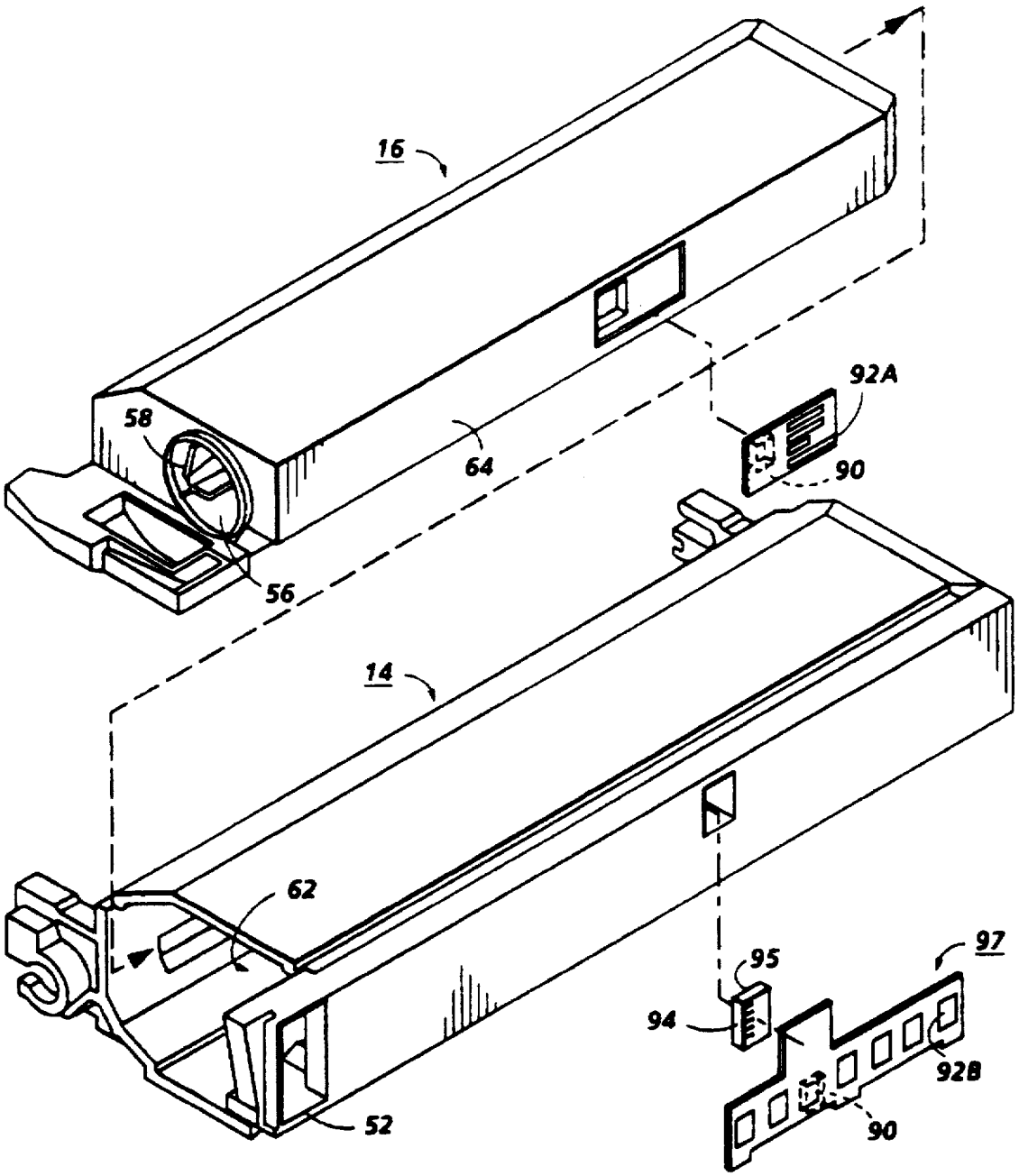
FIG. 8 PRIOR ART

FIGS. 4A and 4B together form a flow-chart illustrating the operation of a system according to the present invention during a printing operation;

FIG. 5 is a simplified schematic diagram illustrating parts of a printing machine and an associated cartridge useful in carrying out a method associated with the invention;

FIG. 6 is a schematic elevational view of a prior-art automatic electrophotographic reproducing machine having replaceable photoreceptor, developer, and toner cartridges, each monitored and warranted for a predetermined number of copies in accordance with the teachings of the present invention;

FIG. 7 is a perspective view showing details of the replaceable photoreceptor cartridge for the machine shown in FIG. 6 together with the mechanism for establishing electrical contact between the photoreceptor cartridge EEPROM and the machine control unit on insertion of the cartridge into place; and FIG. 8 is a perspective view showing details of the replaceable developer and toner cartridges for the machine shown in FIG. 6.

The invention will now be described with reference to a preferred embodiment of the monitor/warranty system of the present invention using Customer Replaceable Units (CRUs) in the form of cartridges. Although the system of the present invention is particularly well adapted for use in automatic electrophotographic reproducing machines, it should become evident from the following description that it is equally well suited for use in a wide variety of processing systems including other electrophotographic systems and is not necessarily limited in application to the particular embodiment shown herein.

Referring to FIGS. 6–8, there is shown by way of example an automatic electrophotographic reproducing machine 10 of the type adapted to implement the system of the present invention shown, reproducing machine 10 comprises a laser printer employing replaceable photoreceptor, developer, and toner cartridges 12, 14, 16 respectively, each of which is designed to provide a preset number of images in the form of prints or copies. And while machine 10 is exemplified in the ensuing description and drawings as a printer, other types of reproducing machines such as copiers, ink jet printers, etc. may be envisioned.

In the ensuing description, as will appear more fully, cartridges 12, 14, 16 are each warranted to produce a preset number of images (Y). When the number of remaining images reaches a predetermined level (X), a warning is given. This warning is to allow the customer time to order a new cartridge. After the above mentioned warning has been given, the machine will continue to make the last remaining images (X). At this point the total images (Y) have been made and the cartridge is disabled and further operation of machine 10 is prevented. At that point, the 'dead' cartridge 12, 14, or 16 must be removed and replaced by a new 'live' cartridge for further operation of machine 10.

Photoreceptor cartridge 12 includes a photoreceptor drum 20, the outer surface 22 of which is coated with a suitable photoconductive material, and a charge corotron 28 for charging the drum photoconductive surface 22 in preparation for imaging. Drum 20 is suitably journaled for rotation within the cartridge body 25, drum 20 rotating in the direction indicated by the arrows to bring the photoconductive surface thereof past exposure, developer, and transfer stations 32, 34, 36 of machine 10 on installation of cartridge 12 in the machine. To receive photoreceptor cartridge 12, a suitable cavity 38 is provided in machine frame 18, the cartridge body 25 and cavity 38 having complementary shapes and dimensions such that on insertion of cartridge 12 into cavity 38, drum 20 is in a predetermined operating relation with exposure, developer, and transfer stations 32, 34, 36 respectively. With insertion of cartridge 12, drum 20 is drivingly coupled to the drum driving means (not shown) and the electrical connections to cartridge 12 made.

In the photoreceptor process practiced, the photoconductive surface 22 of drum 20 is initially uniformly charged by charge corotron 28, following which the charged photoconductive surface 22 is exposed by imaging beam 40 at exposure station 32 to create an electrostatic latent image on the photoconductive surface 22 of drum 20.

Imaging beam 40 is derived from a laser diode 42 modulated in accordance with image signals from a suitable source 44. Image signal source 44 may comprise any suitable source of image signals such as memory, document scanner, communication link, etc. The modulated imaging beam 40 output by laser diode 42 is impinged on the facets of a rotating multi-faceted polygon 46 which sweeps the beam across the photoconductive surface 22 of drum 20 at exposure station 32.

Following exposure, the electrostatic latent image on the photoconductive surface 22 of drum 20 is developed by a magnetic brush development system contained in developer cartridge 14. The magnetic brush development system includes a suitable magnetic brush roll 50 rotatably journaled in body 52 of cartridge 14, developer being supplied to magnetic brush roll 50 by toner cartridge 16. To receive developer cartridge 14, a suitable cavity 54 is provided in machine frame 18, cartridge body 52 and cavity 54 having complementary shapes and dimensions such that on insertion of cartridge 14 into cavity 54, magnetic brush roll 50 is in predetermined developing relation with the photoconductive surface 22 of drum 20. With insertion of cartridge 14, magnetic brush roll 50 is drivingly coupled to the developer driving means (not shown) in machine 10 and the electrical connections to cartridge 14 made.

Toner cartridges 16 provides a sump 56 within which toner for the magnetic brush development system in developer cartridge 14 is provided. A rotatable auger 58 mixes the toner is sump 56 and provides toner to magnetic brush roll 50. Magnetic brush roll 50 is suitably journaled for rotation in the body 52 of cartridge 16.

As seen best in FIG. 8, body 52 of developer cartridge 14 forms a cavity 62 for receipt of toner cartridge 16, cavity 62 of cartridge 14 and body 64 of cartridge 16 having complementary shapes and dimensions such that on insertion of cartridge 16 into cavity 62, cartridge 16 is in predetermined operating relation with the magnetic brush roll 50 in developer cartridge 14. With insertion of toner cartridge 16, auger 58 is drivingly coupled to the developer driving means (not shown) and the electrical connections to cartridge 16 made.

Prints of the images formed on the photoconductive surface of drum 20 are produced by machine 10 on a suitable support material, such as copy sheet 68 or the like. A supply of copy sheets 68 is provided in plural paper trays 70, 72, 74. Each tray 70, 72, 74 has a feed roll 76 for feeding individual sheets from the stack of sheets in tray 70, 72, 74 to a registration pinch roll pair 78. Following registration, the sheet is forwarded to transfer station 36 in proper timed relation with the developed image on drum 20. There, the developed image is transferred to the copy sheet 68. Following transfer, the copy sheet bearing the toner image is separated from the photoconductive surface 22 of drum 20 and advanced to fixing station 80 wherein roll fuser 82 fixes the transferred powder image thereto. A suitable sheet sensor 85 senses each finished print as the print passes from fixing station 80 to output tray 86. After fusing, the toner image to the copy sheet, the sheet 68 is advanced by print discharge rolls 84 to print output tray 86.

Any residual toner particles remaining on the photoconductive surface 22 of drum 20 after transfer are removed by a cleaning mechanism (not shown) in photoreceptor cartridge 12.

To control operation of machine 10, a suitable control panel 87 with various control and print job programming elements is provided. Panel 87 additionally includes a suitable message display window 88 for displaying various operating information to the machine operator.

Referring particularly to FIGS. 7 and 8, in order to assure that only authorized and unexpired photoreceptor, developer, and toner cartridges are used as well as to maintain running count of the number of images made with each cartridge and prevent further use when the cartridge is used up, each cartridge 12, 14, 16 has a memory 90 in the form of a chip integral therewith. To enable memory 90 to be electrically connected and disconnected with the machine on installation or removal of the cartridges, contact pads 92A or 92B are provided. Terminal blocks 94 and a terminal board 97 are employed to complete the electrical connection between memories 90 and the machine control unit.

As seen in FIG. 7, the terminal block 94 for photoreceptor cartridge 12 is mounted on a part 96 of the cavity 38 within which photoreceptor cartridge 12 fits. On installation of photoreceptor cartridge 12, contact pads 92A engage contacts 95 of the terminal block 94 to complete the electrical connection to the memory 90. As seen in FIG. 8, the terminal block 94 for toner cartridge 16 is mounted on terminal board 97. The EEPROM 90 for developer cartridge 14 is also mounted on board 97. Contact pads 92B on board 97 serve to electrically couple the memory 90 of developer cartridge 14 and, through the intermediary of terminal block 94, the memory 90 of toner cartridge 16 to the machine control unit. On installation of toner cartridge 16 into the cavity 62 formed by developer cartridge 14, contact pads 92A of the toner cartridge memory 90 engage contacts 95 of the terminal block 94 for toner cartridge 14 on board 97. On installation of the developer cartridge 14 into machine 10, contacts 92B for both the memory 90 of toner cartridge 16 and the memory 90 of developer cartridge 14 mate to a second set of contacts mounted on the machine frame (not shown) to complete the electrical connection.

Figure 1:
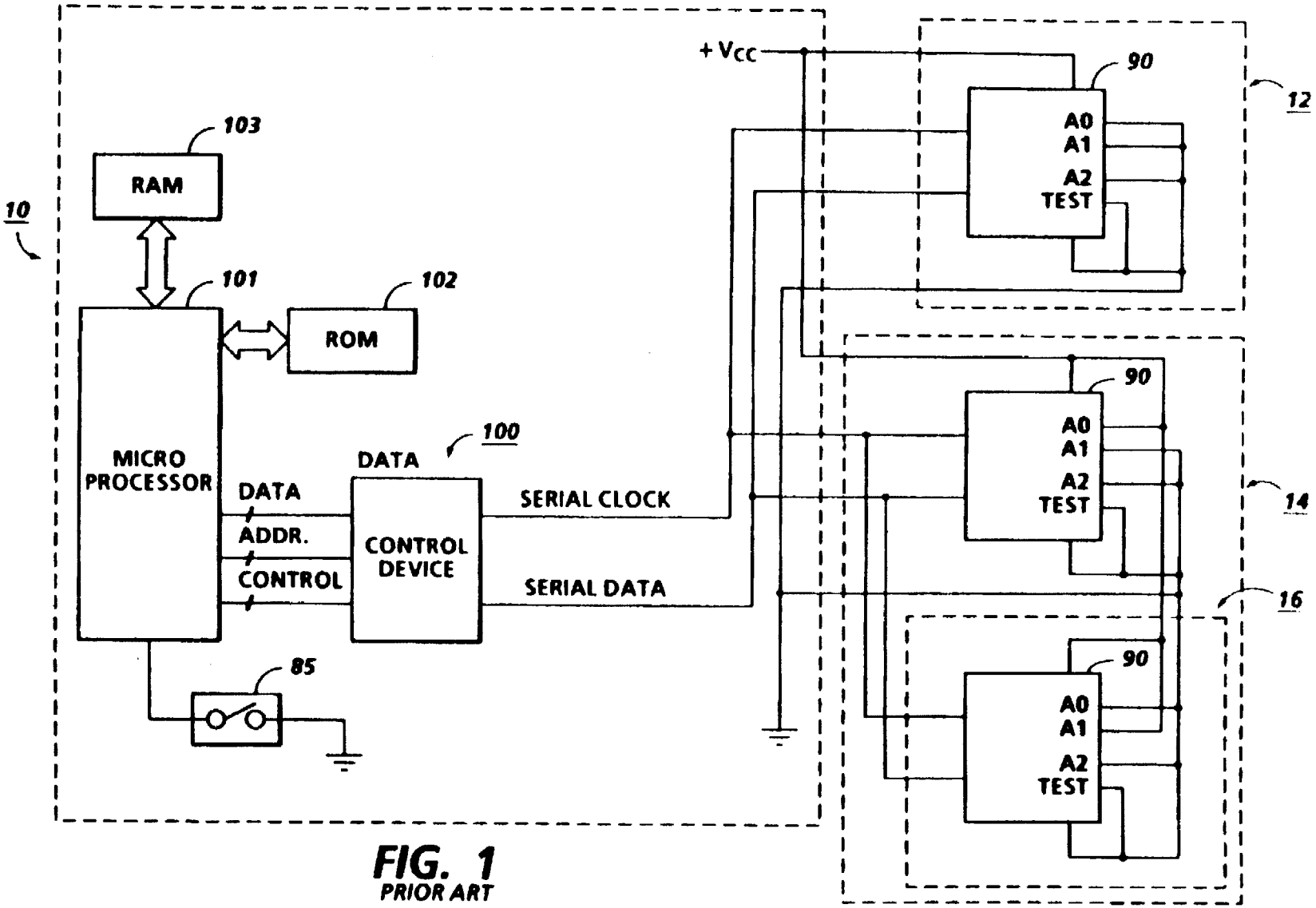
FIG. 1 PRIOR ART
FIG. 1 is a schematic diagram showing details of the machine control unit and the coupling therewith with the EEPROMs of the photoreceptor, developer, and toner cartridges.

Referring now to FIG. 1, a suitable machine control unit (MCU) 100 which includes one or more microprocessors 101 and suitable memory, such as ROM (Read Only Memory) and RAM (Random Access Memory) memories 102, 103 respectively for holding the machine operating system software, programming data, etc., is provided, control unit 100 operating the various component parts of machine 10 in an integrated fashion to produce prints.

The memory 90 for each cartridge 12, 14, 16 provides addressable memory for storing or logging a count of the number of images remaining on each cartridge, the count being stored on the various memories 90 by control unit 100 at the end of each run. Each memory is pre-programmed with a maximum count Y reflecting the maximum number of images that can be made by the cartridge. The counting system is a decrementing type system with the count Y in memories 90 being decremented as images are made to provide a current image count. When the current image count Y reaches a termination count which in the example described is zero, the cartridge is rendered unusable. To alert or warn the customer when the cartridge is nearing the end of life, a warning count X reflecting the predetermined number of remaining images left on the cartridge is also provided in memories 90. When the warning image count X is reached, a message is displayed in message display window 88 of control panel 87 to warn the operator that the cartridge currently in use is nearing end of life and should be replaced. Typically the warning count X provides a few hundred to a few thousand images within which the operator must obtain a replacement cartridge if continued operation of the machine is to be assured.

Maximum image count Y and the warning image count X are typically pre-programmed into the memories 90 at the factory. Additionally, in order to assure that only authorized Memories are used, an identification number is preferably pre-programmed and stored in the EEPROM for each cartridge 12, 14, 16.

Whenever machine 10 is powered up, an initialization routine is entered in which the identification numbers of cartridges 12, 14, 16 are read and compared with the corresponding recognition numbers stored in ROM 102. Where the identification number of any cartridge does not match the recognition number for that cartridge, operation of machine 10 is prevented and the message (WRONG TYPE CARTRIDGE) is displayed in display window 88. The basic principle of operation of a cartridge-identification system is described in detail in, for example, U.S. Pat. No. 4,961,088, assigned to the assignee of the present application and incorporated herein by reference.

Presuming that the correct cartridges are installed, a check is made to see if the cartridges have reached the end of the cartridge life. For this, the current image count logged in each memory 90 is obtained and compared with the termination count, here zero. Where the current image count is equal to or less than zero the cartridge is exhausted and the message (END OF LIFE) is displayed for the exhausted cartridge in display window 88. Operation of machine 10 is inhibited until the exhausted cartridge is replaced. Presuming that the cartridges 12, 14, 16 have not reached the end of life (and that no other faults are found), the machine enters the standby state ready to make prints.

On a print request, machine 10 cycles up and commences to make prints. Control unit 100 counts each time a finished print is detected by print sensor 85 as the finished print passes from fixing station 80 into output tray 86. When the print run is completed and the machine cycles down, the total number of images made during the run, i.e., the image run count, is temporarily stored in RAM 103. Control unit 100 fetches the current image count from the memory 90 of each cartridge 12, 14, 16 and, using the image run count from RAM 103, calculates a new current image count for each memory 90 reflecting the number of images remaining on the cartridge. Control unit 100 then writes the new current image count back into the individual memories 90 of each cartridge 12, 14, 16. This new count is then verified to insure accuracy.

Prior to returning the new current image counts to memories 90, control unit 100 compares each new current image count against the warning count X stored in memories 90 of each cartridge 12, 14, 16. Where the new current image count is equal to or less than the warning count X, a message (ORDER REPLACEMENT CARTRIDGE) is displayed for the particular cartridge in the control panel message display window 88. This alerts the operator to the fact that the identified cartridge is about to expire and that a new replacement cartridge should be available.

The new current image count for each cartridge is also compared with the termination count, exemplified here by zero. Where the current image count is equal to or less than zero for a cartridge, the cartridge is disabled and the message (END OF LIFE) for the cartridge is displayed in the message display window 88. Control unit 100 prevents further operation of machine 10 until the expired cartridge is replaced by a fresh cartridge.

Figure 2:
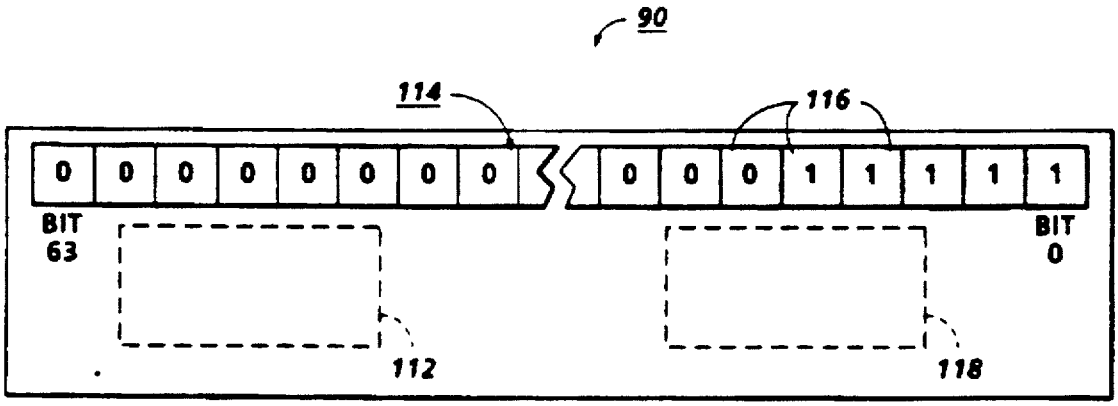
FIG. 2 is symbolic representation of a count memory and flag memory which comprise the EEPROM of one of the replaceable cartridges according to the present invention.

FIG. 2 is a symbolic representation of a memory 90 which is permanently associated with one or more of the cartridges 12, 14, 16. Any type of electronic memory system could be adapted for use in the present invention, such as ROM, RAM, magnetic stripe, barcode, or optical memory systems; further, it is possible that each cartridge may include multiple memory means, of different types. As mentioned above, the memory 90 for each cartridge provides addressable memory for storing or logging a count of the number of images remaining on each cartridge. According to the present invention, the memory 90 comprises at least two separate memories, a count memory generally indicated as 112, and a flag memory 114. Flag memory 114 comprises a series of electronic "flags," which are embodied as a set of bits 116. The representation of the memory 90 in FIG. 2 is purely symbolic, but one skilled in the art of read-only memories will appreciate the embodiment of memories 112 and 114 in an EEPROM. Count memory 112 is a section of memory adapted to retain a running count (starting from maximum count Y, as described above) of how many prints or copies are produced or otherwise associated with a particular cartridge on which the memory 90 is permanently attached. Typically, count memory 112 is initially loaded with a maximum count Y, a number equal to the number of copies or prints the manufacturer intends to be output with the cartridge, which is typically a number on the order of 20,000. The cumulative count in count memory 112 is typically started in a new cartridge at the number of intended copies, and then is caused to count down in a manner as described above, one by one from maximum count Y down to zero.

Simultaneous with the one-by-one counting stored in count memory 112 is the action of flag memory 114. Flags 116 are in the form of identifiable bits in the EEPROM which are alterable from a 1-state to a 0-state, but not from a 0-state to a 1-state. Thus, while an individual flag 116, originally in a 1-state, may be caused to be altered to a 0-state, the individual flag 116 can never be "revived" from a 0-state to a 1-state. It will be appreciated by those skilled in the art of computer memories that such a once-only memory may be created by hardware means associated with the memory, such as by locating flag memory 114 on a PROM portion of memory 90, or by disabling or omitting means such as the "charge pump" which are typically used in EEPROMs to alter a bit from a 0-state to the 1-state for the flag 116 in flag memory 114. Because of this hardware structure, each flag 116 in flag memory 114 can, in the course of use, be altered only "downward."

The function of the flag memory is to act as a second memory with which the one-by-one count in the count memory 112 must be generally consistent. That is, the flags 116 in flag memory 114 are used to provide a rough indicator of the remaining life on the cartridge with which the EEPROM is associated. The flag memory 114 thus acts as a tamper-proof check on the count memory 112. Because the flags 116 in flag memory 114 cannot be artificially moved upward, as can the count memory 112, the flag memory 114 will act to prevent or override any attempts at artificially extending the life of a cartridge by altering the count memory 112.

In the illustrated embodiment of the present invention, flag memory 114 is in the form of a set-aside set of 64 bits of PROM within memory 90. Assuming, for purposes of the present example, that the intended life of a cartridge which memory 90 is permanently associated is 20,000 copies, one flag 116 will be altered from the 1-state to the 0-state at a regular interval of counts from the count memory 112. A simple implementation would be to design for an interval that is a multiple of two, such as 128,256, or 512. This will greatly simplify the required calculations within the machine controller. The interval value is preferably stored in a "once-only" memory 118, such as a PROM, within memory 90, so that it is factory-adjustable depending on the maximum intended life of the cartridge. It is preferable to have this interval as small as possible, as it will determine the extent of tamper-proofing.

Thus, assuming a cartridge is designed to have a useful life Y of 20,000 prints or copies; the number of available flags 116 in the flag memory 114 is 64; and the interval for altering each flag will be 1024 prints or copies; the preferred additional number of intervals is 20, because 20,000 divided by 1024 is 19.5. The initial factory programming of the flag memory 114 would clear (permanently set to zero) the first 44 of the 64 available flags, leaving the remaining 20 flags set to logic 1. The control system in the copier or printer will check the bits and determine that the maximum life of the cartridge is 20,480 (1024×20). Finding this, the system will determine that the cartridge has not been tampered with as the original remaining life in count memory 114 is 20,000.

As the cartridge is used, as the count memory 112 is reduced by one with each print, an important point is a remaining life of 1024×19, or 19,456. At this point, the system will alter the first available 1-state flag 116 in flag memory 114 to 0. If, after this point, someone were to tamper with the device by setting the remaining life in count memory 112 to a higher value, the system would change the remaining count in count memory 112 to a value equal to the number of 1-state flags 116 in flag memory 114, times 1024. For example, if the cartridge was used until the remaining life in the count memory 112 was 3,000 copies, because of the incremental altering of flags 116 in flag memory 114, there will remain three flags remaining at the 1-state. If the remaining count in count memory 112 were changed to 20,000, to artificially increase the life of the cartridge, the system would determine that this count was in excess of the maximum available life and revise the count in count memory 112 to 3072 (1024×3). The symbolic value of remaining copies associated with the cartridge is maintained by the number of remaining flags in flag memory 114. Because flag memory 114 is tamper-proof, flag memory 114 acts as an override, if necessary, for the one-by-one count downward from Y in count memory 112.

It will further be appreciated by those skilled in the art of computer memories that the memory 90 permanently associated with each individual cartridge 12, 14, 16 may also have associated therewith the necessary peripheral hardware, such as an address pointer, data latches, shift register, etc., to allow the various portions of memory 90 to be accessed by the general machine system as needed to carry out the invention.

Figure 3:
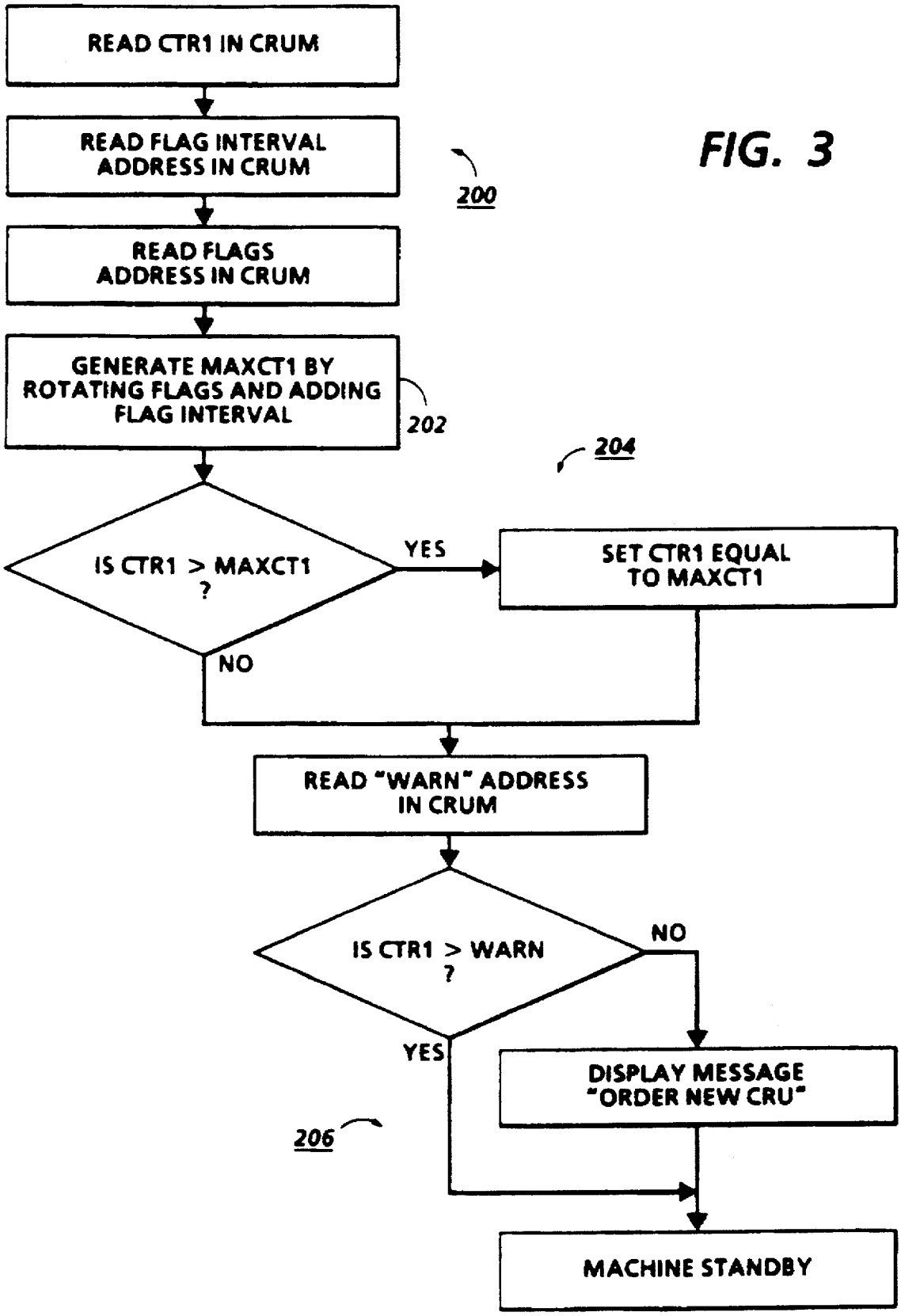
FIG. 3 is a flow-chart illustrating the operation of a system according to the present invention at system start-up.

FIG. 3 is a flow chart showing the operation of a control system for a printer during the power-up stage of the printer operation. At power-up, which may follow the replacement of a CRU in the machine, the system embodied in the machine itself will, as shown in the boxes at the beginning of the process indicated as 200, first read a counter value ("CTR1") from count memory 112 in memory 90, and then read an interval value from memory 118. As mentioned above, the symbolic value of the number of copies remaining in the CRU 12, 14, or 16, as held in the flag memory 114 must be consistent with the current cumulative number of prints produced, held in count memory 112. However this system is carried out, the number of one-state flags can then be used, as shown at box 202, to generate a maximum count ("MAXCT1") which is typically the number of one-state flags remaining, times the preselected interval from memory 118 which each one-state flag is intended to represent, e.g. 512. This maximum count MAXCT1 thus represents the actual intended remaining number of prints left in the particular CRU. Thus, regardless of the value of CTR1 in count memory 112, the value of MAXCT1 shall always override CTR1, and provision must be made in the system for carrying out this override, as shown by the decision tree 204 in the flow chart. Finally, there may also be supplied in the system, a provision whereby at a predetermined number of remaining prints toward the end of the life of the CRU, a warning message may be displayed by the machine to indicate that the CRU is nearing the end of its life, as at decision tree 206. One way of doing this is to assign one of the last remaining flags 116 in flag memory 114 to activate, upon the change of state thereof, a system within the machine to cause the warning message to be displayed.

FIGS. 4A and 4B, together form a single flow chart illustrating the operation of a counting system according to the present invention during the copying or printing of n copies. In a particular job, whether in copying or printing, a certain preselected number n of prints or copies will be made with the machine. This number is entered, either by selecting an appropriate button on the control panel (in the case of the copier), or, determined by the size of a printing job queued into a printer. In this embodiment of the method of the present invention, counting apparatus within the machine will, either just before or just after execution of a particular job, read the value of copies remaining from memory 112, to obtain the number of copies left on the particular cartridge in question, and this value is read as CTR1. With the execution of a particular job, the value of CTR1 read into the machine is modified by subtracting n, the number of prints made, to obtain the new value of CTR1, which represents the number of prints available on the cartridge after execution of the job. This step is shown as box 300 in FIG. 4. Following the change in value of CTR1, as shown by the decision tree generally marked 302, the new value of CTR1 is compared to 0 to make sure the new value of CTR1 is not a negative number. The value of CTR1 may become negative if the number of prints n made in a particular job exceeds the original value of CTR1. In such cases, it is typically allowable to have the job finish even though the final result will be to cause the value of CTR1 to become negative. A practical downside of this feature is that copies of poor quality may be created, but only a limited number of copies may be made in excess of CTR1 anyway, because of constraints such as replenishing a paper supply. If the new value of CTR1 is less than 0, it is simply set to 0 at the end of the job.

The newly calculated value of CTR1 determined in the machine is then written into memory 112 on the cartridge, as shown at box 304. This written value of CTR1 is then verified, as shown in the decision block 306, wherein the value of counter 1 in the machine control is compared to the new value of CTR1 in the cartridge. Then, the value of CTR1 from the cartridge is compared to 0 as shown at section 308 of the flow chart. If the value of CTR1 is 0, a message is preferably displayed, as shown, instructing the user to replace the cartridge. Also, as shown at section 310, the value of CTR1 can be compared to a "warn" value when a preselected level of prints have been made. If the value of CTR1 on the cartridge is less than a predetermined WARN value, a message may be displayed, as shown, to alert the user to order a new cartridge.

In addition to modifying the value of CTR1, which maintains the one-by-one count of prints or copies made with the cartridge, the condition of the flags 116 in flag memory 114 in the cartridge is also checked and, if necessary, manipulated to be consistent with the value of CTR1. As shown in box 312, the number of flags in a particular condition in flag memory 114 can be theoretically calculated from the value of CTR1 through an algorithm which would be apparent depending on the specific design of the system, particularly from the value of the intended interval from memory 118. This calculated flag value based on CTR1 is then compared to the actual condition of flags in the cartridge. As shown in section 314 of the flow chart, the actual value of the flags in the cartridge, which cannot be artificially changed, overrides the calculated value; that is, if there is an inconsistency between the value of CTR1 and the number of flags of a certain state in flag memory 114, the value of CTR1 will be amended (lowered) to be made consistent with the number of flags in the one-state. This value is then verified, at section 314, and then the machine is placed on standby, ready for the next job.

FIG. 5 is a schematic view showing the relationship of the portions 112, 114, and 118 of a memory 90 in a cartridge which may be 12, 14, or 16, with a microprocessor such that shown as 101 in FIG. 1. As part of the permanent structure of copier or printer 10, there is provided read/write means 400, and also processing means 402. The read/write means 400 are adapted to read the existing value of CTR1 from memory 112 of a given cartridge, the intended interval each flag is supposed to represent from memory 118, and also the state of the flags in flag memory 114. Processing means 402, which may be embodied as a portion of a standard microprocessor, is adapted to carry out the steps shown in FIGS. 3 and 4, by means of, for example, a program routine carried out by the processor, similarly, the processor means 402 is adapted to cause the read/write means 400 to change the value of CTR1 in memory 112 as needed, and to alter the state of a particular flag in flag memory 114.

While the present invention has been described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

I claim:

1. A replaceable unit relating to an output of a predetermined number of [prints] *print sheets* in [an electrophotographic] *a* printer, comprising:

a first memory, permanently associated with the replaceable unit, adapted to retain counting data relating to a cumulative *number of* output *print sheets* relating to the replaceable unit; and a second memory, permanently associated with the replaceable unit, having a plurality of flags associated therewith, each flag being statable in one of a first state and a second state, each flag being alterable from the first state to the second state but not alterable from the second state to the first state.

2. A unit as in claim 1, further comprising an integrated circuit, comprising the first memory and second memory.

3. A unit as in claim 1, wherein the first memory comprises an EEPROM.

4. A unit as in claim 1, further comprising a toner supply.

5. A unit as in claim 1, further comprising a photoreceptor.

6. A unit as in claim 1, further comprising a third memory permanently associated with the replaceable unit, adapted to retain a number related to a relationship between the cumulative output relating to the replaceable unit and the number of flags in a state in the second memory.

7. A monitoring system for a replaceable unit in [an electrophotographic] *a printing* apparatus, the replaceable unit being adapted to relate to an output of a predetermined number of [prints] *print sheets*, comprising:

a first memory, permanently associated with the replaceable unit, adapted to retain counting data relating to a cumulative *number of* output *print sheets* relating to the replaceable unit;

a second memory, permanently associated with the replaceable unit, having a plurality of flags associated therewith, each flag being statable in one of a first state and a second state, each flag being alterable from the first state to the second state but not alterable from the second state to the first state;

means for altering one flag in the second memory from the first state to the second state in response to a predetermined cumulative output relating to the replaceable unit; and means for comparing counting data in the first memory and the number of flags in a predetermined state in the second memory.

8. A monitoring system as in claim 7, further comprising an integrated circuit comprising the first memory and second memory.

9. A monitoring system as in claim 7, further comprising means for revising the counting data in the first memory to be consistent with the number of flags in a predetermined state in the second memory.

10. A monitoring system as in claim 7, wherein the first memory comprises an EEPROM.

11. A monitoring system as in claim 7, wherein the replaceable unit comprises a toner supply.

12. A monitoring system as in claim 7, wherein the replaceable unit comprises a photoreceptor.

13. A monitoring system as in claim 7, further comprising a third memory permanently associated with the replaceable unit, adapted to retain a number related to the predetermined cumulative output relating to the replaceable unit.

14. A method of monitoring a cumulative use of a replaceable unit relating to an output of a predetermined number of [prints] *print sheets* in [an electrophotographic printer] *a printing apparatus*, comprising the steps of:

changing a number stored in a first memory in accordance with the number of [prints] *print sheets* outputted; and altering one flag in a second memory from a first state to a second state when the predetermined number of [prints] *print sheets* are outputted, each flag in the second memory being selectable alterable from the first state to the second state but not alterable from the second state to the first state.

15. A method as in claim 14, further comprising the step of comparing the number in the first memory with a number of flags in a predetermined state in the second memory.

16. A method as in claim 14, further comprising the step of revising a number stored in the first memory to be consistent with the predetermined number of prints outputted causing a flag in the second memory to be altered.

*17. The system of claim 7, further comprising:*

*an identification memory, permanently associated with the replaceable unit, adapted to retain cartridge type identification data associated with a characteristic of the replaceable unit; and*

*identification means, associated with the printing apparatus, for reading cartridge type identification data in the identification memory of a replaceable unit installed in the printing apparatus.*

*18. The system of claim 7, further comprising:*

*disabling means, associated with the printing apparatus, for preventing operation of the replaceable unit in response to a predetermined cumulative output relating to the replaceable unit.*

*19. The method of claim 14, further comprising the steps of:*

*retaining cartridge type identification data associated with a characteristic of the replaceable unit in an identification memory permanently associated with the replaceable unit; and*

*reading the cartridge type identification data in the identification memory of a replaceable unit installed in the printing apparatus.*

* * * * *